UNITED STATES PATENT OFFICE.

ANTOINE BONNET, OF VOIRON, ISÈRE, ASSIGNOR OF ONE-THIRD TO JEAN THORRAND AND VICTOR NICOLET, BOTH OF GRENOBLE, FRANCE.

MODE OF PREPARING CEMENT.

SPECIFICATION forming part of Letters Patent No. 368,449, dated August 16, 1887.

Application filed March 15, 1887. Serial No. 230,961. (No specimens.) Patented in France February 2, 1886, No. 173,949.

*To all whom it may concern:*

Be it known that I, ANTOINE BONNET, of Voiron, Isère, France, and a citizen of the Republic of France, have invented an Improved Mode of Preparing Cement, (for which I have obtained a French patent dated February 2, 1886, No. 173,949,) of which the following is a specification.

This invention consists of an improved mode of preparing artificial cement, which is intended to replace ordinary cements in all their applications, and which has for its base chloride of magnesium. This cement possesses the general properties of ordinary cements, which it is intended to replace. It may be white or colored, as found desirable. It will keep for an indefinite period, and may be transported to any distance, its principal constituent elements remaining separated up to the moment when it is to be used. It consists, essentially, of a mixture of dried chloride of magnesium pulverized (and with or without the addition of inert materials) with a magnesian cement formed of magnesia intimately mixed with a calcareous or other powder.

The preparation of this cement is carried out in the following manner: The chloride of magnesium dissolved, either hot or cold, in the smallest possible quantity of water, has added to it a certain amount of pulverized carbonate of lime, or of any other suitable inert material in a powdered form, and absorbent, and an intimate admixture of these substances is effected during ebullition. The weight or amount of powdered inert material added to the chloride of magnesium will vary according to the absorbent and porous qualities of the substance employed. The thickened mass is kept at a temperature of less than 110° centigrade until chlorhydric vapors are given off. The product then resembles a dried chloride of calcium, and may be easily ground, pulverized, and incorporated with a larger quantity of an inert substance or substances, as may be desired.

The chloride of magnesium may be dried in another way, as follows: After it has been pounded or pulverized I mix with it one or more inert and absorbent substances in quantity which will vary according to the results to be obtained, and the whole is then fed to stone or other grinding mills in small portions. The mixture is then rapidly sifted in order to insure the intimate mingling of the chloride of magnesium with the inert substances and the due preservation of the chloride. The chloride of magnesium dried by either of the above-described processes is then ready to be converted into magnesium cement, quite analogous, as regards its employment and uses, to ordinary cements. For this purpose the magma chlorided with the addition of any inert substances is preserved in casks, if it has to undergo transportation.

The magnesia necessary to the cement has added to it calcareous powder or inert material in quantities which will vary according to the use to which the cement is to be put. This magnesia, with its inert additions, is preferably preserved in sacks. When these materials are to be used for the production of cement, they are mixed in water, substantially equal volumes of chlorided powder and of magnesia powder being mixed together. To this mixture may be added, according to requirement, variable quantities of inert materials, such as sand, or various mineral powders. The highest degree of plasticity is produced by taking care that about one-third of the mixed materials are in the form of impalpable powder. The mixture thus made in water produces a cement adapted for the execution of all kinds of plastering and coverings or coatings for the molding of all kinds of objects in imitation of stucco, marbles, or mosaics by the addition of colored earths, (oxides or salts,) as well as by the choice of the texture of the inert materials incorporated during the preparation or at the time of using the cement.

The cement may also be used to make tiles or pavements, being applied in layers upon stone, wood, or metal. In short, it is capable of advantageously replacing cements in all their applications.

I claim as my invention—

The herein-described method of making cement, said method consisting in first drying chloride of magnesium and pulverizing it, separately preparing a magnesian cement of pulverized magnesia and calcareous powder or inert material, these pulverized substances being preserved separately, and finally mixing the two together, when they are to be used, to form the cement, all substantially as set forth.

In testimony whereof I have signed my name to this specification in the presence of two subscribing witnesses.

BONNET.

Witnesses:
VINCENT BIÉTRIX,
CARRIER JOSEPH.